United States Patent [19]

Kumatani

[11] Patent Number: 4,554,472
[45] Date of Patent: Nov. 19, 1985

[54] LOW INERTIA INDUCTION MOTOR

[75] Inventor: Hiroshi Kumatani, Nagoya, Japan

[73] Assignee: Mitsubishi Denki Kabushiki Kaisha, Tokyo, Japan

[21] Appl. No.: 504,165

[22] Filed: Jun. 14, 1983

[30] Foreign Application Priority Data

Jun. 14, 1982 [JP] Japan .................................. 57-88272

[51] Int. Cl.$^4$ ............................................. H02K 9/06
[52] U.S. Cl. ..................................... 310/62; 310/266; 310/67 R
[58] Field of Search ...................... 310/266, 67, 77, 76, 310/62, 63, 59, 64, 65

[56] References Cited

U.S. PATENT DOCUMENTS

| | | | |
|---|---|---|---|
| 2,142,067 | 12/1938 | Allen | 310/266 UX |
| 2,542,659 | 2/1951 | Gillett | |
| 2,626,366 | 1/1953 | Stoner et al. | |
| 2,653,256 | 9/1953 | Walley et al. | |
| 2,974,242 | 3/1961 | Apstein | |
| 3,217,195 | 11/1968 | Ferranti | 310/266 X |
| 3,648,090 | 3/1972 | Voin | |
| 3,749,949 | 7/1973 | Müller | 310/62 X |
| 3,777,191 | 12/1973 | Papst et al. | 310/67 |
| 4,337,406 | 6/1982 | Binder | 310/266 X |

FOREIGN PATENT DOCUMENTS

3323297 6/1983 Fed. Rep. of Germany .
274216 9/1970 U.S.S.R. .

*Primary Examiner*—Donovan F. Duggan
*Attorney, Agent, or Firm*—Oblon, Fisher, Spivak, McClelland & Maier

[57] ABSTRACT

A low inertia induction motor to increase to speed responding characteristic at the time of its start and stop comprises a stator core fixed inside a frame, a yoke disposed in confrontation to the stator core with a space gap and a rotor interposed within the space gap between the yoke and the stator core. A through-hole is formed at the center portion of the frame for supporting the yoke or the stator core, a rotationary shaft is rotatably inserted into the through-hole and the rotational shaft is attached with a rotational plate for supporting the rotor and a cooling fan for feeding cooling air in the interior of the frame.

7 Claims, 2 Drawing Figures

LOW INERTIA INDUCTION MOTOR

BACKGROUND OF THE INVENTION

This invention is concerned with a low inertia induction motor which is so constructed that its speed responding characteristic at the time of its start and stop may be enhanced.

Generally speaking, in a servo motor for numerical control, or a driving motor for industrial sewing machines, or others, a steep rising or trailing performance is required in the rotational speed thereof for augmenting its responding characteristic at the start and stop.

For such use in industry, there has so far been employed in general a direct current electric motor driven by a thyrister-Leonard control power source. However, this d.c. motor has various disadvantages such that it necessitates a permanent magnet, a commutator, a commutating brush, and others, that it cannot increase its rotational speed so much from the standpoint of its commutating characteristic, that it has a limit against reduction in its size and weight, and that it requires careful, constant watch on and maintenance due to wear of the commutating brush, and various other disadvantages.

In contrast to this, since the induction motor can be operated in a maintenance-free fashion, it can take the place of the d.c. motor for the aforementioned use, provided that an inexpensive inverter control electric power source becomes available.

However, since the conventional induction motor includes in its rotor a yoke portion which constitutes a part of the magnetic pass for the rotating magnetic field, the rotor increases its weight, and the speed response thereof disadvantageously lowers due to increase in the inertial moment. As the means for improving such point of disadvantage, there have been adopted various methods such as one that uses a fly-wheel which is constantly driven by the motor to perform connection and disconnection betweeh the fly-wheel and the load by means of a clutch, so as to utilize the energy of rotation of the fly-wheel, and other methods. Even such measure, however, is not perfectly free from the disadvantages in that the power consumption is great, and the construction of the motor is complicated so as to invite an increase in the manufacturing cost.

SUMMARY OF THE INVENTION

It is therefore an object of the present invention to provide an improved induction motor which is free from the disadvantages in the conventional induction motor as mentioned in the foregoing discussion.

It is another object of the present invention to provide a low inertia induction motor excellent in its speed response, which has been realized by separating the yoke portion constituting a part of the magnetic pass for the rotating magnetic field from the rotor thereof.

The foregoing and the other objects of the present invention have been attained by providing a low inertia induction motor comprising a yoke disposed in confrontation to a stator core, around which a stator winding is wound, through a space gap between them, a frame with a through-hole being formed at the center portion and with a supporting portion to support the yoke or the stator core, a rotor rotatably supported within the space gap, a rotational shaft extending into the through-hole of the frame and being supported in a freely rotatable manner, a rotational plate fixedly secured to the rotational shaft to support the rotor and a cooling fan fixedly secured to the rotational shaft and feeding cooling air into the interior of the frame through the revolution of the rotational shaft.

The foregoing objects, other objects as well as specific construction and function of the low inertial induction motor according to the present invention will become more apparent and understandable from the following detailed description thereof when read in conjunction with the accompanying drawing.

Figure 1:
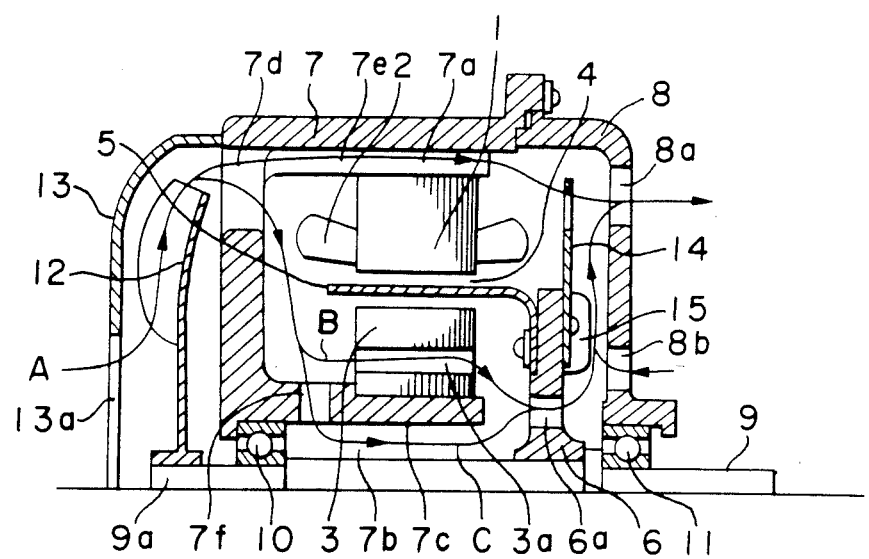
FIG. 1 is a cross-sectional view showing one embodiment of the induction motor according to the present invention in its upper half portion.

In the following, embodiments of the present invention will be described in detail with reference to drawing.

DETAILED DESCRIPTION OF THE PREFERRED EMBODIMENTS

In the drawings, a reference numeral 1 designates a stator core, around which stator winding 2 is wound; numeral 3 refers to a yoke disposed at the radially inner portion of the stator core 1 and opposed to the inner peripheral surface of the stator core 1 with a predetermined space gap; numeral 3a designates a through-hole formed passing through the yoke 3; numeral 5 designates a cylindrical rotor holding a main part which extends into the space or gap 4 between the yoke 3 and the stator core 1. The rotor 5 may be formed of a conductive body such as aluminum, copper, silver-copper alloy, and so forth. Reference numeral 6 designates a rotary disc or plates to hold the side part of the rotor 5, and being made of a material excellent in heat conductivity such as aluminum, etc. The base portion of the rotary disc is fitted to a rotational shaft which will be described hereinafter. Numeral 6a designates an air passage formed in the rotary disc 6; numeral 7 designates a frame provided, at the inner surface of its outer peripheral portion, a plurality convex portions 7a which are formed as one-piece with the frame and apart from each other by a space and extending in the axial direction of the frame. On the convex portions, the outer peripheral part of the stator core 1 is attached and secured to the frame 7. The frame has a through-hole 7a formed at the center part in the axial direction thereof and has an annular projection 7c constituting the inner wall of the through-hole 7b, the yoke 3 being supported on the outer peripheral portion of the annular projection 7c; numeral 7f designates an air ventilating hole formed in the annular projection 7c; reference numeral 8 denotes a bracket covering an opening portion at the load side of the frame 7; numeral 9 refers to a rotational shaft which supports the inner peripheral portion of the annular projection 7c of the frame 7 and the bracket 8 through bearings 10, 11, and also supports the rotary disc 6 inside the bracket 8; numeral 12 refers to a cooling fan which is supported at the end part 9a of the rotational shaft 9 opposite to the load side, and which supplies cooling air into the interior of the frame 7 through an air passage 7d; reference numeral 13 designates a fan cover fitted to the frame 7 to enclose the cooling fan 12; reference numeral 13a denotes an air intake port formed in the fan cover 13; numeral 14 refers to a radiation plate attached onto the load side of the rotary disc 6; and numeral 15 designates an air discharge fan which is integrally formed with the radiation plate 14.

When the induction motor of the above-described construction is driven by supplying alternating current through the stator winding 2, there is generated the rotating magnetic field, and the yoke 3 constitutes a part of the magnetic path for the rotating magnetic field. As the result of this, the rotor 5 inserted into the space or gap 4 forms a linkage with the magnetic flux to generate an eddy current. By the electromagnetic action between this eddy current and the magnetic field, there is generated a torque to drive the rotor 5. This torque is transmitted to the rotary shaft 9 through the rotary disc 6 to drive the load.

By this driving of the load, a large amount of heat is generated in the stator winding 2, the stator core 1 and the yoke 3 at the start and during operation of the motor, whereby the temperature in these parts becomes greatly elevated. However, the cooling air blown out by the cooling fan 12 is partly introduced, as shown by an arrow A, into an air passage 7e defined along the projected part 7a which supports the stator core 1 to cool the outer peripheral portion of the stator core 1, after which it is discharged outside through the discharge port 8a in the bracket 8. The other portion of the cooling air passes through an air passage 3a holed in the yoke 3 and an air ventilating hole 7f formed in the annular projection 7c of the frame 7 to be blown into an air passage leading so as to the through-hole 7b, as shown by arrows B and C. Then, the air passes through an air passage 6a formed in the rotary disc 6 and is accelerated in the direction of the outer periphery of the disc 6 by the air discharging fan 15, followed by discharge from the discharge port 8a. In addition, the air discharging fan 15 also draws cooling air from an air intake port 8b of the bracket 8. The cooling air from the air intake port 8b is combined with the cooling air from the air passage 6a to cool the rotary disc 6 and the radiation plate 14 which have been heated by conduction of heat generated in the rotor 5, and then is discharged from the air discharge port 8a.

Figure 2:
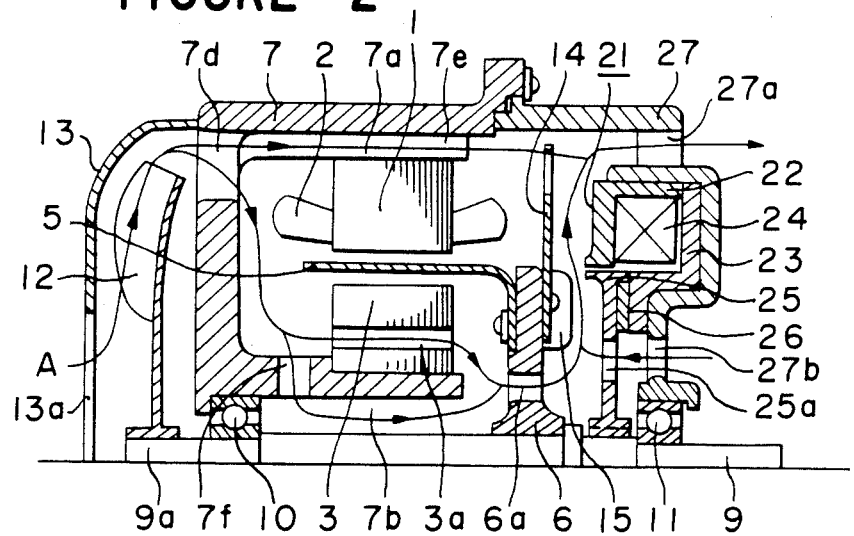
FIG. 2 is also a cross-sectional view showing another embodiment of the induction motor according to the present invention in its upper half portion.

FIG. 2 illustrates another embodiment of the present invention, in which an electromagnetic brake is provided for abrupt stoppage of the load. In the drawing, the same reference numerals as in FIG. 1 designate identical or equivalent parts. Reference numeral 21 designates an electromagnetic brake; 22 to 26 refer to constituent parts of the electromagnetic brake 21, of which 22 and 23 denote iron cores to support a brake winding 24 in the inner peripheral portion of the iron cores; numeral 25 refers to a brake disc which is constantly energized by a spring (not shown) in the direction to be away from the iron core 23, and which is slidably held on the rotational shaft 9 in its axial direction; numeral 25a refers to an air passage port; reference numeral 26 indicates a brake lining fixedly secured on the surface opposite to the iron core 23 of the brake disc 25; a numeral 37 refers to a bracket made of a non-magnetic material, which is connected to the load side of the frame 7 to support the iron cores 22, 23 of the electromagnetic brake 21; and 27a and 27b denote, respectively, an air discharge port and an air intake port formed in the bracket 27.

When the induction motor constructed as described in the foregoing is to be abruptly stopped, the stator winding 2 is disconnected from the power source and an exciting current is caused to pass through the brake winding 24 of the electromagnetic brake 21, whereby there is formed a magnetic circuit passing through the iron cores 22, 23 and the brake disc 25. As the result of this, the rotating brake disc 25 is attracted to the iron core 23 under a sliding movement on the rotational shaft 9 in the axial direction and the load stops instantaneously by way of the brake disc 25 and the rotational shaft 9, owing to friction between the brake lining 26 provided on the brake disc 25 and the iron core 23. It is to be further noted that, since the bracket 27 is constructed with the non-magnetic material as mentioned in the foregoing, there is no possibility of the magnetic flux generated by excitation of the brake winding 24 leaking out to the brake disc 25 through the bearing 11, and hence no apprehension of the bearing 11 becoming damaged. Further, when this induction motor is used for driving industrial sewing machine, the temperature in the electromagnetic brake 21 increases due to frequent starting and stopping. This temperature increase, however, can be inhibited and an appropriate temperature level can be maintained by cooling the inner side of the electromagnetic brake 21 with cooling air which is drawn through the air intake port 27b of the bracket 27 and the air passage port 25a of the brake disc 25 by means of the air discharging fan 15 as well as cooling air which is drawn through the air passage port 6a of the rotary disc 6 by the cooperation of the cooling fan 12 and the air discharging fan 15 and then by discharging the air outside through the air discharge port 27a of the bracket 27.

In the preferred embodiments of the present invention which have so far been described hereinabove, the stator core 1 is supported at the outer peripheral side of the rotor 5 and the yoke 3 at the inner peripheral side of the rotor 5. It should, however, be noted that the stator core 1 may be supported at the inner peripheral side of the rotor 5 and the yoke at the outer peripheral side of the rotor 5. In this latter case, the air passage will be formed in the stator 1.

Further, in the embodiments of the present invention, the air passage is formed in the yoke 3 per se, although the outer peripheral part of the annular projection 7c may be utilized as the air passage same as in the axial convex portion 7a.

As mentioned in the foregoing discussion, since the induction motor according to the present invention has attempted to improve the cooling method of the internal heat generating portion thereof, along with separation from the rotor of the yoke portion to be a part of the magnetic path for the rotating magnetic field, there can be provided the low inertia induction motor which is low in the temperature rise in the motor interior and excellent in the responding characteristic to the speed increase and decrease.

I claim:

1. A low inertia induction motor which comprises in combination:
 a yoke disposed in confrontation to a stator core, around which a stator winding is wound, forming a space between said yoke and said stator winding;
 a frame with a through-hole being formed at the center portion thereof and a supporting portion to support said yoke and said stator core;

a rotary disc having an air passage formed therein and radially extending between said yoke and an axial end portion of said frame;

a rotor rotatably supported on a first side of said rotary disc and positioned within said space;

a rotational shaft extending into said through-hole of said frame and being supported in a freely rotatable manner;

a cooling fan fixedly secured to said rotational shaft and feeding cooling air into the interior of said frame through the revolution of said rotational shaft wherein said frame and said stator core form a through-hole through which cooling air is fed into the interior of said frame by means of said cooling fan from outside said frame and said yoke has a through-hole formed therein to pass cooling air introduced into the interior of said frame by said cooling fan; and an air discharge fan mounted on a second side of said rotary disc opposite said first side of said rotor, said axial end portion of said frame including an air intake port for drawing air thereinto by said air discharge fan and an air discharge port formed therein such that air drawn through said air passage formed in said rotary disc is accelerated in a radial direction toward an outer periphery of said rotary disc.

2. A low inertia induction motor according to claim 1, wherein said rotary disc is made of a material excellent in heat conductivity.

3. A low inertia induction motor according to claim 1, wherein said rotor further comprises a cylindrical, heat conductive rotor having a main portion thereof extending into said space between said yoke and said stator winding.

4. A low inertia induction motor which comprises in combination:

a yoke disposed in confrontation to a stator core, around which a stator winding is wound, forming a space between said yoke and said stator winding;

a frame with a through-hole being formed at the center portion thereof and a supporting portion to support said yoke or said stator core;

a rotary disc having an air passage formed therein and radially extending between said yoke and an axial end portion of said frame;

a rotor rotatably supported on a first side of said rotary disc and positioned within said space gap;

a rotational shaft extending into said through-hole of said frame and being supported in a freely rotatable manner;

a cooling fan fixedly secured to said rotational shaft and feeding cooling air into the interior of said frame through the revolution of said rotational shaft;

electromagnetic braking means attached to said rotational shaft to brake the revolution of said rotational shaft wherein said frame and said stator core form said through-hole through which cooling air is fed into the interior of said frame by means of said cooling fan from outside said frame and said yoke has a through-hole formed therein to pass cooling air introduced into the interior of said frame by said cooling fan; and an air discharge fan mounted on a second side of said rotary disc opposite said first side of said rotor, said axial end portion of said frame including an air intake port for drawing air thereinto by said air discharge fan and an air discharge port formed therein such that air drawn through said air passage formed in said rotary disc is accelerated in a radial direction toward an outer periphery of said rotary disc.

5. A low inertia induction motor according to claim 4, wherein said rotary disc is made of a material excellent in heat conductivity.

6. A low inertia induction motor according to claim 4, wherein said rotor further comprises a cylindrical, heat conductive rotor having a main portion thereof extending into said space between said yoke and said stator winding.

7. A low inertia induction motor according to claim 4 wherein said electromagnetic braking means is provided with an air passage for passing cooling air therethrough.

* * * * *